United States Patent [19]

Wakahara

[11] Patent Number: 5,501,311
[45] Date of Patent: Mar. 26, 1996

[54] FLUID PRESSURE CONTROL DEVICE FOR VARIABLE TORQUE TRANSFER OF FOUR WHEEL DRIVE VEHICLE

[75] Inventor: Tatsuo Wakahara, Kawasaki, Japan

[73] Assignee: Nissan Motor Co., Ltd., Yokohama, Japan

[21] Appl. No.: 319,047

[22] Filed: Oct. 6, 1994

[30] Foreign Application Priority Data

Nov. 24, 1993 [JP] Japan .................................. 5-293658

[51] Int. Cl.⁶ ............................................... F16D 48/02
[52] U.S. Cl. ....................................... 192/85 R; 180/248
[58] Field of Search ........................ 192/85 R, 85 AA, 192/109 F; 180/233, 248

[56] References Cited

U.S. PATENT DOCUMENTS

| | | | |
|---|---|---|---|
| 4,481,877 | 11/1984 | Takano et al. | 180/233 |
| 4,858,646 | 8/1989 | Kato et al. | 192/85 R X |
| 5,056,614 | 10/1991 | Tokushima et al. | 192/85 R X |
| 5,366,041 | 11/1994 | Shiraishi et al. | 180/248 |

FOREIGN PATENT DOCUMENTS 2-68225  3/1990  Japan .

*Primary Examiner*—Andrea L. Pitts
*Attorney, Agent, or Firm*—Foley & Lardner

[57] ABSTRACT

A four wheel drive motor vehicle is of a type which has a variable torque transfer through which the driving force distribution between front and rear wheels is varied in accordance with the magnitude of a fluid pressure supplied to the transfer. A fluid pressure control device for producing the fluid pressure comprises a first hydraulic circuit which is arranged to have a first operation mode wherein the first hydraulic circuit outputs, for the transfer, a fluid pressure which is varied continuously; a second hydraulic circuit which is arranged to have a second operation mode wherein the second hydraulic circuit outputs, for the transfer, a fluid pressure which is varied stepwisely; a piping for connecting the first and second hydraulic circuits to constitute a united hydraulic circuit; and shutters arranged in given portions of the piping to selectively open and close the given portions for allowing the united hydraulic circuit to have the first and second operation modes selectively.

15 Claims, 6 Drawing Sheets

FLUID PRESSURE CONTROL DEVICE FOR VARIABLE TORQUE TRANSFER OF FOUR WHEEL DRIVE VEHICLE

BACKGROUND OF THE INVENTION

1. Field of the Invention

The present invention relates in general to four wheel drive motor vehicles of a type having a variable torque transfer which can control the driving force distribution ratio between front and rear wheels, and more particularly to a fluid pressure control device which controls the engaged condition of a variable torque clutch of the transfer by feeding the torque clutch with a controlled fluid pressure.

2. Description of the Prior Art

Japanese Patent First Provisional Publication 2-68225 shows a four wheel drive vehicle which is equipped with a transfer and a fluid pressure control device of the transfer. The vehicle disclosed by the publication is of a so-called "part-time four wheel drive vehicle" which is based on the front engine rear drive (FR) type. That is, in the four wheel drive mode of the vehicle, the driving force from the engine is distributed, through a driving force transmitting system including the transfer, to the front and rear wheels with a predetermined torque distribution ratio therebetween. The transfer is equipped with a variable torque clutch which can vary the torque distribution ratio by changing its engaged condition. That is, the engaged condition of the clutch is varied by a fluid pressure fed to a cylinder chamber of the clutch. The fluid pressure control device is connected to the cylinder chamber to feed the same with a pressure-controlled fluid. The fluid pressure control device has a fluid source from which the fluid is driven, by an electric motor or the like, to the cylinder chamber of the variable torque clutch through a check valve and a pressure control valve of proportional control type. The pressure control valve is controlled by an instruction current which is applied thereto from a control unit. That is, in accordance with the magnitude of the instruction current fed to the proportional solenoid of the pressure control valve, the outlet pressure of the pressure control valve, viz., the pressure (or clutch pressure) of the fluid fed to the variable torque clutch is varied. That is, the clutch pressure fed to the variable torque clutch is controlled in proportion to the magnitude of the instruction current from the control unit, and the engaged condition of the clutch is controlled by the controlled clutch pressure thereby controlling the torque distribution ratio between the front and rear wheels.

However, due to its inherent construction, the above-mentioned fluid pressure control device has the following drawbacks.

First, the clutch pressure fed to the transfer should be precisely controlled by only the pressure control valve. This inevitably induces the need of high costly pressure control valve.

Second, in the fluid pressure control device, there is employed an arrangement wherein to obtain the engaging force of the variable torque clutch which is proportional to the clutch pressure, the clutch pressure is continuously increased from a lower level by increasing the instruction current applied to the proportional solenoid. Thus, it takes time (viz., transient time) to change the drive mode from the two wheel drive mode to the four wheel drive mode. In the two wheel drive mode, the variable torque clutch is not in use, while, in the four wheel drive mode, the torque clutch is in use establishing a certain torque distribution between the front and rear wheels. In fact, the transient time is the period passed from the time when the clutch pressure is still low (two wheel drive mode) to the time when the clutch pressure has increased to a level sufficient for the four wheel drive mode.

In order to solve the above-mentioned drawbacks, various measures have been hitherto proposed, one of which is shown in. FIG. 6 of the accompanying drawings.

The fluid pressure control device shown in the drawing comprises a first fluid supply line 11 through which a pressurized fluid from a pressurized fluid source 10 flows. Designated by numerals 40 and 41 are a check valve and a fluid flow stabilizer respectively. The first fluid supply line 11 leads to an inlet portion of a pressure adjusting valve 12 by which the pressure of the fluid is adjusted to a predetermined level, that is, the line pressure level. An outlet port of the pressure adjusting valve 12 leads to a fluid tank 13, which parts constitute a drain system. The first fluid supply line 11 further leads to both an inlet port of a clutch pressure control valve 50 which can reduce the line pressure to a first lower level and an inlet port of a pilot valve 19 which can reduce the line pressure to a second lower level. The clutch pressure control valve 50 uses its outlet pressure as a pilot pressure of itself, and the outlet pressure of the valve 50 is led to a switch valve 51. The switch valve 51 has an outlet port led to a variable torque clutch "VTC", more specifically, to a cylinder chamber of the clutch "VTC". The pilot valve 19 sets its outlet pressure by using the same as a pilot pressure. The outlet pressure of the pilot valve 19 is led to a clutch pressure controlling electromagnetic valve 21. The electromagnetic valve 21 carries out an open and close operation at high speed to produce a continuously variable outlet pressure which is fed to the clutch pressure control valve 50 as a pilot pressure. With this, the outlet pressure of the clutch pressure control valve 50 is varied continuously that is, in a stepless manner.

The first fluid supply line 11 further leads to an inlet port of a switch valve controlling electromagnetic valve 24. The outlet pressure of the valve 24 is fed to the switch valve 51 as a pilot pressure. When electrically energized, the electromagnetic valve 24 takes ON (or fluid supply) position causing the switch valve 51 to assume a shut off position compressing its spool spring 51a. Under this condition, the associated motor vehicle takes the two wheel drive mode.

The fluid source 10 is powered by the engine of the associated motor vehicle. The pressure adjusting valve 12 uses the pressure of the fluid from the fluid source 10 as a pilot pressure. That is, when the fluid pressure from the fluid source 10 exceeds a predetermined level (viz., line pressure level), the pressure adjusting valve 12 opens and flows a part of the fluid to the drain system thereby keeping the fluid pressure at the predetermined line pressure level. The line pressure possessed by the fluid from the first fluid supply line 11 is reduced by a given degree by the clutch pressure control valve 50 and then fed to the switch valve 51 as a clutch pressure. The fluid pressure (viz., clutch pressure) produced by the clutch pressure control valve 50 is continuously varied or controlled by the continuously variable pressure provided by the clutch pressure controlling electromagnetic valve 21.

The operation of the switch valve 51 is controlled in ON/OFF manner by the switch valve controlling electromagnetic valve 24. That is, when the electromagnetic valve 24 is energized and thus takes the fluid supply position, the switch valve 51 takes OFF position, that is, the shut off position. Under this condition, the clutch pressure produced by the clutch pressure control valve 50 fails to reach the variable torque clutch "VTC" and thus the motor vehicle takes the two wheel drive mode. While, when the switch valve controlling electromagnetic valve 24 is deenergized and thus takes a fluid draining position, the switch valve 51 takes its ON position, as shown, permitting the clutch pressure to reach the variable torque clutch "VTC". Upon this, the motor vehicle takes the four wheel drive mode.

However, even the above-mentioned fluid pressure control device of FIG. 6 has the following drawbacks due to its inherent construction.

First, the pilot pressure continuously produced by the clutch pressure controlling electromagnetic valve 21 tends to have a marked pulsation due to the high speed reciprocating movement of the valve 21 by the instruction current applied thereto. The instruction current is in the form of a pulse signal. Furthermore, the pilot pressure produced by the valve 21 tends to vary widely due to high sensitivity of the valve 21 to the instruction current. These phenomena cause the variable torque clutch "VTC" to fail to exhibit a satisfied performance.

Second, in the fluid pressure control device, there is employed the arrangement wherein in order to switch the drive mode from the two wheel drive mode to the four wheel drive mode, the switch valve controlling electromagnetic valve 24 is forced to take the fluid draining position as shown. Thus, upon this switching, it tends to occur that the line pressure fed to the variable torque clutch "VTC" drops for a moment. Although this drawback may be solved by usage of a three-way valve, usage of such valve increases the production cost of the fluid pressure control device.

SUMMARY OF THE INVENTION

It is therefore an object of the present invention to provide a fluid pressure control device for the variable torque clutch of the transfer, which is free of the above-mentioned drawbacks.

According to the present invention, there is provided a fluid pressure control device which can selectively take first and second operation modes by only manipulating selected shutters arranged in a piping of the control device. In the first operation mode, the control device produces, for the variable torque clutch of the transfer, a clutch pressure which is varied continuously, while, in the second operation mode, the control device produces, for the variable torque clutch, a clutch pressure which is varied stepwisely.

According to the present invention, there is provided, in a four wheel drive system having a variable torque transfer through which the driving force distribution between front and rear wheels of a vehicle is varied in accordance with the magnitude of fluid pressure supplied to the transfer, a fluid pressure control device which produces the fluid pressure supplied to the transfer. The fluid pressure control device comprises a first hydraulic circuit which is arranged to have a first operation mode wherein the first hydraulic circuit outputs, for the transfer, a fluid pressure which is varied continuously; a second hydraulic circuit which is arranged to have a second operation mode wherein the second hydraulic circuit outputs, for the transfer, a fluid pressure which is varied stepwisely; piping means for connecting the first and second hydraulic circuits to constitute a united hydraulic circuit; and shutters arranged in given portions of the piping means to selectively open and close the given portions for allowing the united hydraulic circuit to have the first and second operation modes selectively.

DETAILED DESCRIPTION OF THE INVENTION

Figure 5:
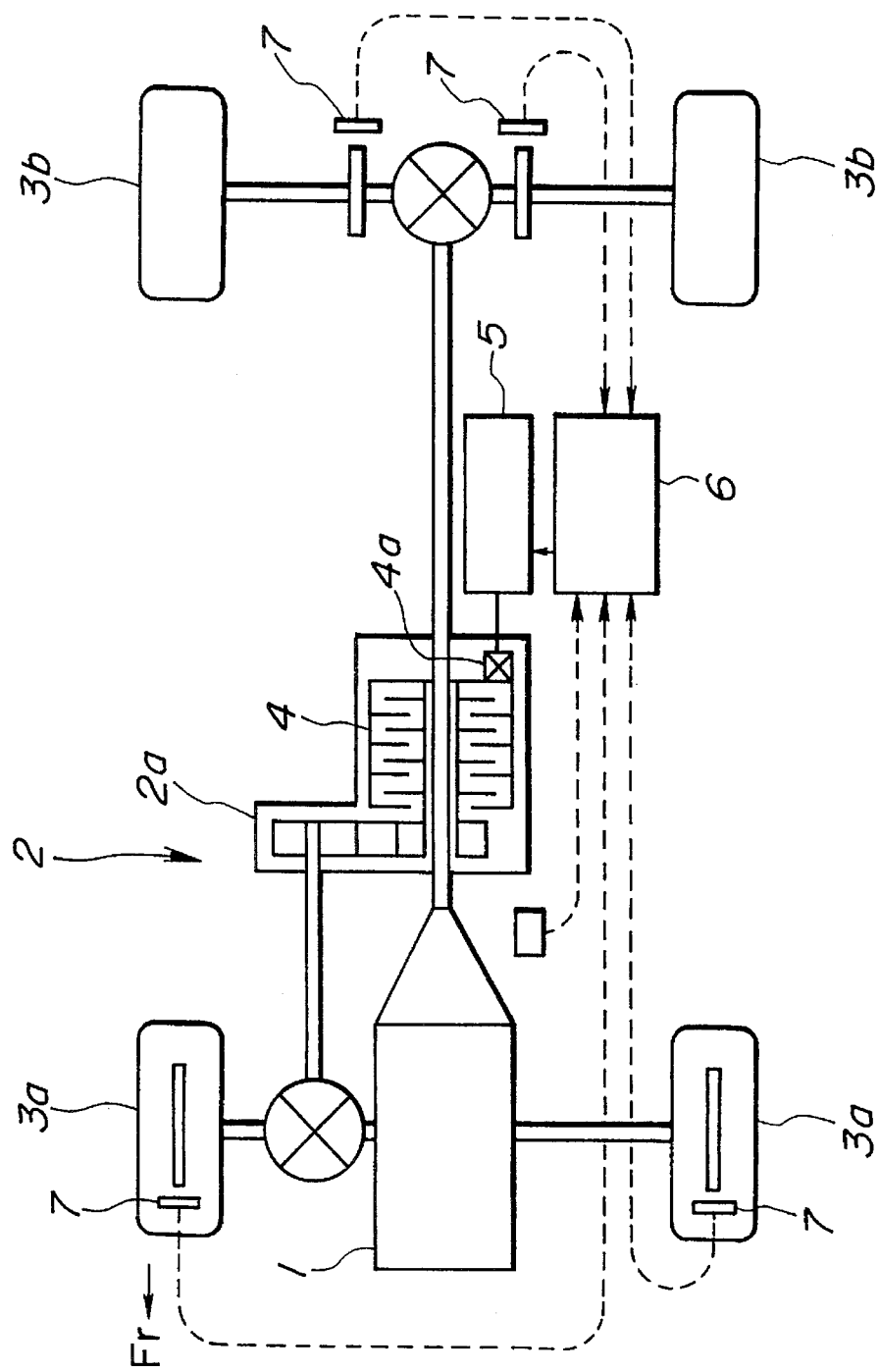
FIG. 5 is a schematically illustrated part-time four wheel drive motor vehicle based on a front engine rear drive (FR) type, to which the present invention is practically applied.

Referring to FIG. 5 of the drawings, there is schematically shown a part-time four wheel drive motor vehicle based on a front engine rear drive (FR) type, to which the present invention is practically applied. In the drawing, denoted by numeral 1 is an engine which generates a driving force. The driving force can be transmitted to two front wheels 3a as well as two rear wheels 3b with a predetermined torque distribution ratio established therebetween through a driving force transmitting system 2 which is equipped with a transfer 2a.

The transfer 2a is equipped with a variable torque clutch 4 which can vary the torque distribution ratio between the front and rear wheels 3a and 3b by changing the engaged condition thereof. The engaged condition is controlled and adjusted by a clutch pressure applied to a cylinder chamber 4a of the clutch 4.

A fluid pressure control device 5 of the present invention is connected to the cylinder chamber 4a of the variable torque clutch 4. Thus, in operation, a controlled clutch pressure is applied to the cylinder chamber 4a from the pressure control device 5 in the manner which will be described hereinafter.

Denoted by numeral 6 is a control unit which issues instruction signals to the control device 5, and denoted by numerals 7 are wheel speed sensors for respective wheels 3a and 3b.

The engine 1 is equipped with a fluid pump which serves as a pressurized fluid source 10 (see FIG. 1) from which a pressurized fluid is fed to the fluid pressure control device 5 through an after-mentioned pressure control means. As is known in the art, the fluid pressure from the fluid pump is also used as a base pressure for various hydraulic clutch operating mechanisms installed in a motor vehicle.

Figure 1:
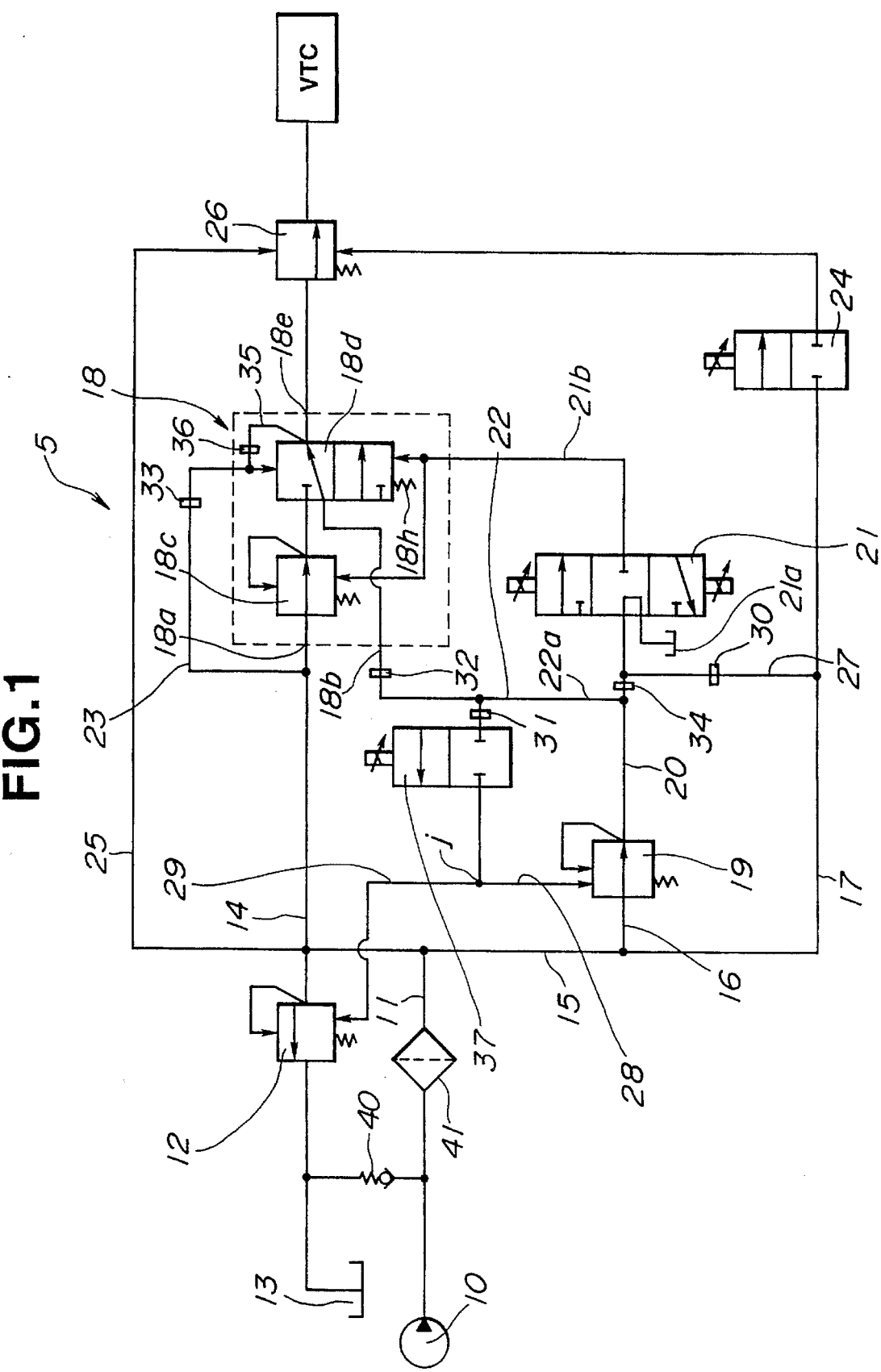
FIG. 1 is a hydraulic circuit of a fluid pressure control device according to the present invention.

Referring to FIG. 1 of the drawings, there is shown the fluid pressure control device 5 of the present invention. From the pressurized fluid source 10, there extends a first fluid supply line 11 which leads to an inlet port of a pressure adjusting valve 12. An outlet port of the pressure adjusting valve 12 leads to a fluid tank 13, which constitute a drain system. The pressure adjusting valve 12 uses its inlet pressure as a pilot pressure of itself, so that when the pilot pressure exceeds a predetermined line pressure level, the valve 12 opens and flows a part of the fluid to the drain system thereby keeping the fluid pressure (viz., line pressure) at the predetermined line pressure level.

From the first fluid supply line 11, there extend second and third fluid supply lines 14 and 15 separately. The second fluid supply line 14 leads to a first inlet port 18a of a clutch pressure control valve 18 to feed the same with the line pressure.

From the third fluid supply line 15, there extend fourth and fifth fluid supply lines 16 and 17 separately. The fourth fluid supply line 15 leads to an inlet port of a pilot valve 19 to feed the same with the line pressure. The pilot valve 19 uses its outlet pressure as its pilot pressure and thus produces a predetermined fluid pressure which is lower than the line pressure. The outlet port of the pilot valve 19 is connected through a sixth fluid supply line 20 to an inlet port of a clutch pressure controlling electromagnetic valve 21. The electromagnetic valve 21 carries out an open and close operation to produce a desired outlet pressure which is fed to the clutch pressure control valve 18 as a pilot pressure.

As shown, the electromagnetic valve 21 has three, that is, first, second and third positions. In the first position, the fluid pressure in the fifth fluid supply line 17 is applied to the valve 18 as the pilot pressure, in the second position, the application of the fluid pressure from the line 17 to the valve 18 is blocked while discharging the fluid pressure in the line 17 into a draining system 21a, and in the third position, the application of the fluid pressure from the line 17 to the valve 18 is blocked while discharging the fluid contained in a pilot line 21b between the valves 21 and 18 into the draining system 21a.

From the sixth fluid supply line 20, there extends a fourth connecting line 22 which constitutes a fourth connecting means. The fourth connecting line 22 leads to a second inlet port 18b of the clutch pressure control valve 18 to feed the second inlet port 18b with the reduced fluid pressure produced by the pilot valve 19.

The clutch pressure control valve 18 is a unit equivalent to a combination which generally comprises a pressure reducing valve 18c and a switch valve 18d. The pressure reducing valve 18c produces, from the line pressure fed from the first inlet port 18a, a reduced fluid pressure which is varied in accordance with a pilot pressure produced by the clutch pressure controlling electromagnetic valve 21. The switch valve 18d has two positions, one being a first position wherein the first inlet port 18a is communicated with the outlet port of the switch valve 18d and the other being a second position wherein the second inlet port 18b is communicated with the outlet port. These first and second positions are selectively taken in accordance with balance and unbalance in pressure between a first hydraulic biasing force which biases the valve spool of the switch valve 18d in one direction and a second hydraulic biasing force which biases the valve spool in the other direction. The first biasing force is the line pressure introduced by a fifth connecting line 23 extending from the second fluid supply line 14 or a pilot pressure produced at the outlet port 18e of the switch valve 18d, and the second biasing force is the pilot pressure produced by the clutch pressure controlling electromagnetic valve 21.

Denoted by numerals 33 and 36 are shutters. That is, when the shutters 33 and 36 take their operative positions, the connecting lines 23 and 35 to which the shutters are connected become inoperative or closed. As shown, the shutter 36 is connected to a connecting line 35 which feeds the outlet pressure of the switch valve 18d to the switch valve 18d as a pilot pressure.

Figure 4:
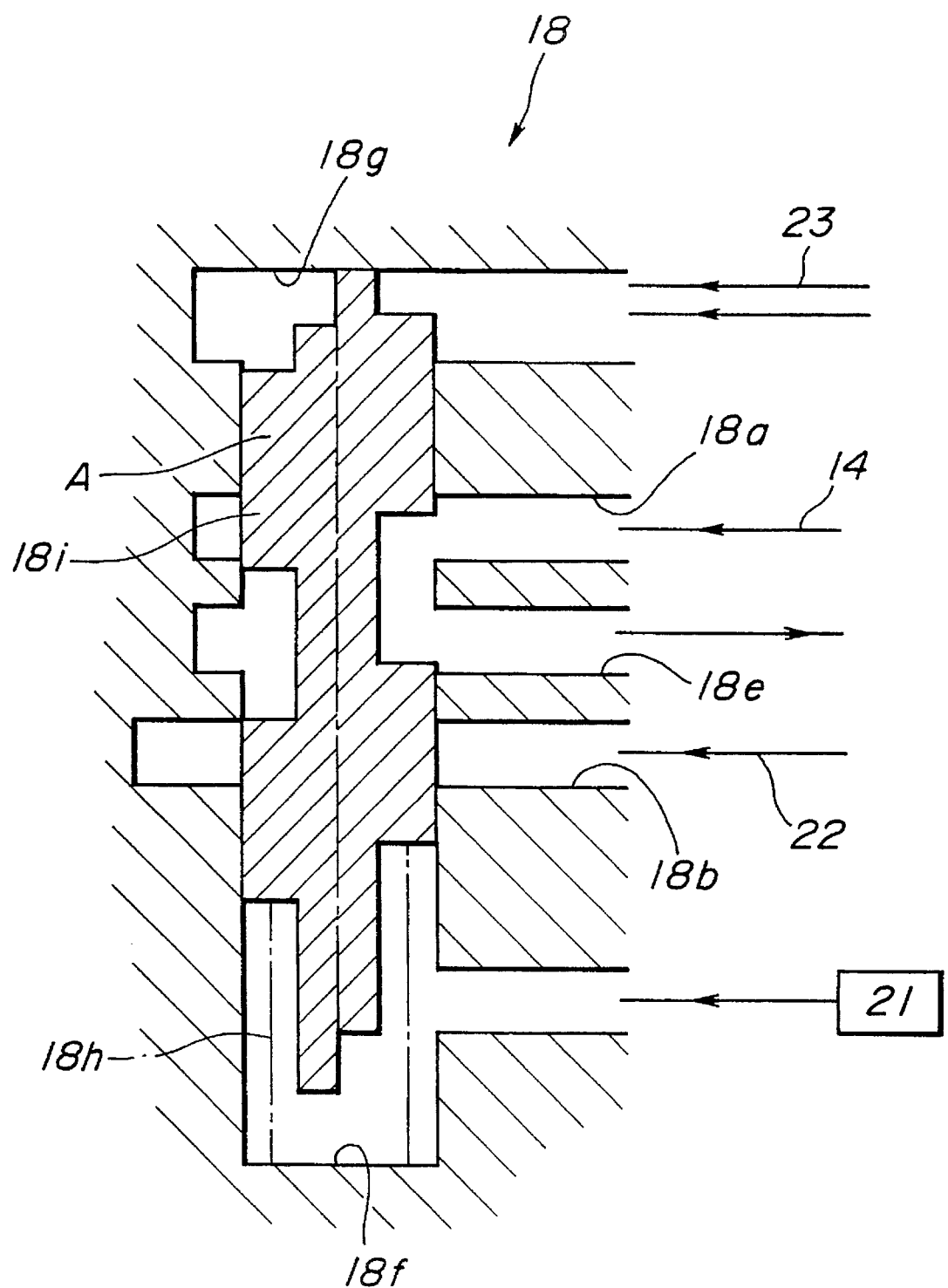
FIG. 4 is an enlarged sectional view of a clutch pressure control valve employed in the fluid pressure control device of the invention.

FIG. 4 shows the detail of the clutch pressure control valve 18. That is, under a condition wherein the connecting line 23 (see FIG. 1) is kept inoperative or closed by the shutter 33, the reduced pressure (or clutch pressure) prevailing in the outlet port 18e is applied to the valve spool 18i to bias the same downward in FIG. 4 toward the position "A" against the force of the spool spring 18h. In this position "A", the communication between the first inlet port 18a and the outlet port 18e is blocked. However, under this condition, the pilot pressure produced by the clutch pressure controlling electromagnetic valve 21 is also applied to the valve spool 18i to bias the same against the just mentioned reduced pressure (or clutch pressure). Thus, the valve spool 18i is moved in a direction to establish the communication between the first inlet port 18a and the outlet port 18e. Thus, in accordance with the magnitude of the pilot pressure from the valve 21, the communication between the first inlet port 18a and the outlet port 18e is controlled, and thus, a desired clutch pressure is produced at the outlet port 18e of the clutch pressure control valve 18.

While, under a condition wherein the connecting line 23 (see FIG. 1) is kept opened, the line pressure prevailing in the second fluid supply line 14 is applied to the valve spool 18i to bias the same toward the lowermost position (in FIG. 4) against the force of the spool spring 18h. In this lowermost position, the lower end of the valve spool 18i contacts a lower wall 18f of the spool receiving chamber blocking the communication between the first inlet port 18a and the outlet port 18e while establishing the communication between the second inlet port 18b and the outlet port 18e. However, under this condition, the pilot pressure produced by the clutch pressure controlling electromagnetic valve 21 is also applied to the valve spool 18i to bias the same against the just mentioned line pressure. Thus, the valve spool 18i is moved in a direction to establish the communication between the first inlet port 18a and the outlet port 18e. When the pilot pressure from the valve 21 is great, the upper end of the valve spool 18i becomes in contact with an upper wall 18g of the spool receiving chamber.

Referring back to FIG. 1, the fifth fluid supply line 17 leads to an inlet port of a switch valve controlling electromagnetic valve 24 to feed the same with the line pressure.

From the first fluid supply line 11, there further extends a seventh fluid supply line 25 which leads to a switch valve 26 to feed the same with the line pressure as a pilot pressure for the same. The pilot pressure biases the switch valve 26 in a direction to shut off the associated line.

The outlet pressure of the switch valve controlling electromagnetic valve 24 is also applied to the switch valve 26 as a pilot pressure. The valve 24 is of a normally closed type. That is, when energized, the valve 24 is turned to take its open (or ON) position and thus the line pressure is permitted to reach the switch valve 26 to open the same.

From the fourth connecting line 22, there extends a third connecting line 28 which leads to the pilot valve 19 to feed the same with the fluid pressure in the line 22 as a pilot pressure. The pilot pressure applied to the pilot valve 19 functions to reduce the fluid pressure produced by the valve 19. That is, the fluid pressure produced by the pilot valve 19 is controlled or reduced in accordance with the magnitude of the pilot pressure.

From the third connecting line 28, there extends a second connecting line 29 which leads to the pressure adjusting valve 12 to feed the same with the fluid pressure in the line 22 as a pilot pressure. The set pressure of the pressure adjusting valve 12 increases in accordance with the magnitude of the pilot pressure.

Denoted by numerals 30, 31, 32, and 34 are also shutters. That is, when the shutters 31, 31, 32 and 34 take their operative positions, the connecting lines 27, 28, 22 and 20 to which the shutters are connected become inoperative or closed. It is to be noted that the shutter 31 is positioned upstream of the junction part "j" at which the second connecting line 29 is branched from the third connecting line 28. Thus, when the shutter 31 takes its operative position, the second and third connecting lines 29 and 28 are both inoperative or disabled. The shutter 34 on the sixth fluid supply line 20 is positioned between the junction part at which the fourth connecting line 22 is branched from the line 20 and the junction part at which the first connecting line 27 is branched from the line 20.

An electromagnetic valve 37 is disposed in the third connecting line 28 between the junction part "j" and the shutter 31.

As will become apparent in the following, the fluid pressure control device 5 of the present invention can have two, viz., first and second operation modes by only manipulating some of the shutters 30, 31, 32, 33, 34 and 36.

That is, when it is required to feed the variable torque clutch 4 (see FIG. 5) with a continuously variable clutch pressure in the four wheel drive mode, the shutters 30, 32, 31 and 33 are handled to take their operative positions. With this, the fluid pressure control device 5 of the invention takes the first operation mode wherein the fluid lines 27, 28, 22 and 23 are inoperative or disabled.

Figure 2:
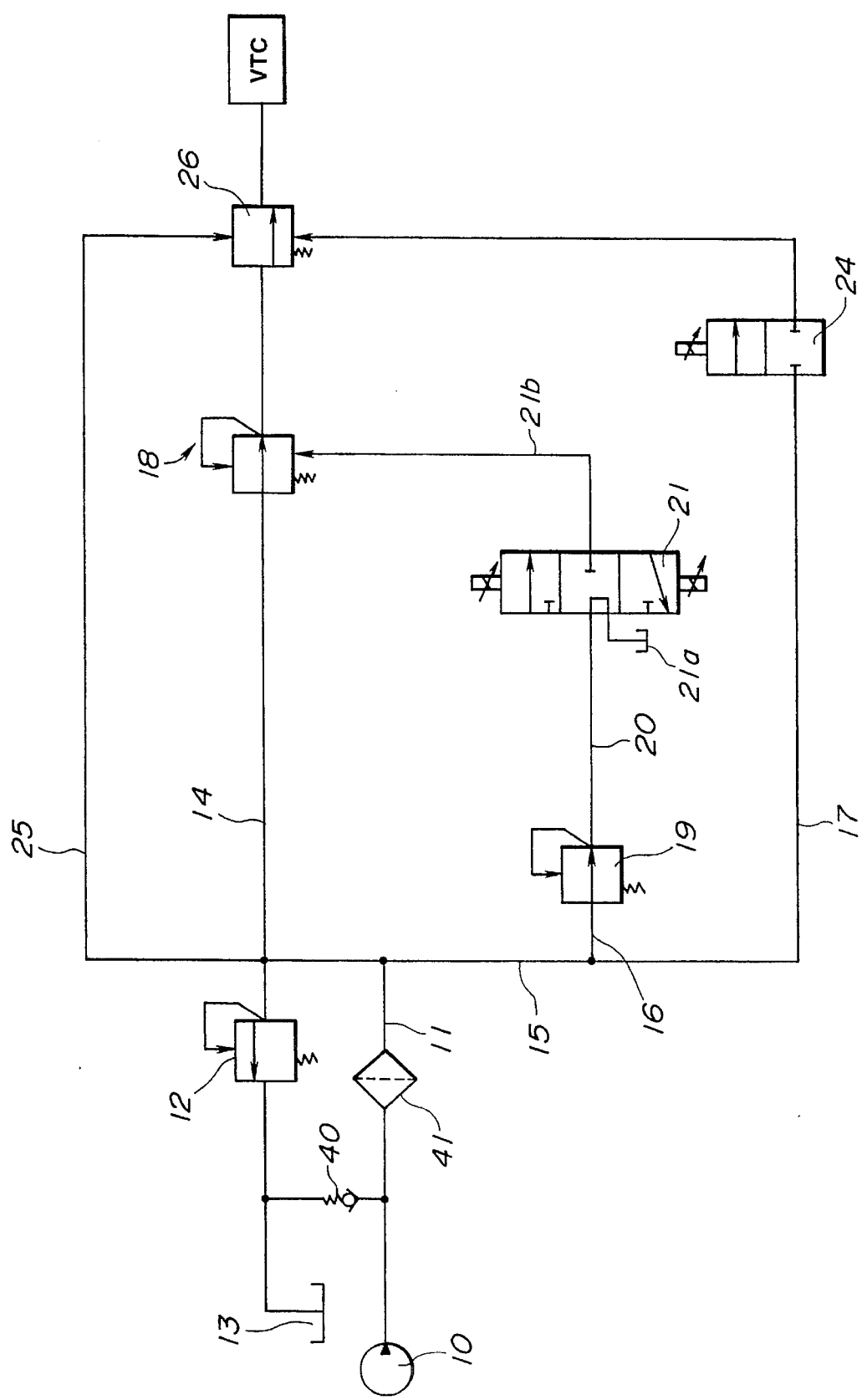
FIG. 2 is a hydraulic circuit which ms provided when the fluid pressure control device of the present invention takes a first operation mode.

A fluid circuit provided when this first operation mode is established is equivalent to the circuit which is illustrated in FIG. 2.

In this first operation mode, using the fluid pressure from the pressurized fluid source 10 as a pilot pressure, the pressure adjusting valve 12 keeps the fluid pressure at a predetermined line pressure level. The clutch pressure control valve 18 reduces the line pressure by a given degree for producing a continuously variable clutch pressure which is fed to the switch valve 26. The clutch pressure produced by the valve 18 is controlled by the continuously variable pilot pressure produced by the clutch pressure controlling electromagnetic valve 21. The switch valve 26 is controlled by the switch valve controlling electromagnetic valve 24.

When the electromagnetic valve 24 is kept deenergized and thus the associated fifth fluid supply line 17 is inoperative, the switch valve 26 is kept OFF as shown, so that the clutch pressure produced by the valve 18 is not fed to the valuable torque clutch "VTC". Thus, under this condition, the associated motor vehicle keeps the two wheel drive mode standing by for a subsequent four wheel drive mode. When then the electromagnetic valve 24 becomes energized and thus the line 17 becomes operative, the switch valve 26 becomes ON, so that the clutch pressure from the valve 18 reaches the variable torque clutch "VTC". Thus, the motor vehicle takes the four wheel drive mode instantly. In this mode, the torque distribution between the front and rear wheels is continuously varied in accordance with the magnitude of the clutch pressure fed to the variable torque clutch "VTC".

If, for some reasons, the above-mentioned first operation mode fails to provide the transfer 2a (see FIG. 5) with a satisfied torque distribution performance, the fluid pressure control device 5 may take a second operation mode. For establishing this second operation mode, the shutters 30, 32, 31 and 33 are manipulated to take their inoperative (or open) positions, and the shutters 34 and 36 are manipulated to take their operative (or close) positions. In the second operation mode thus established, the sixth fluid supply line 20 and the connecting line 35 are inoperative or disabled.

Figure 3:
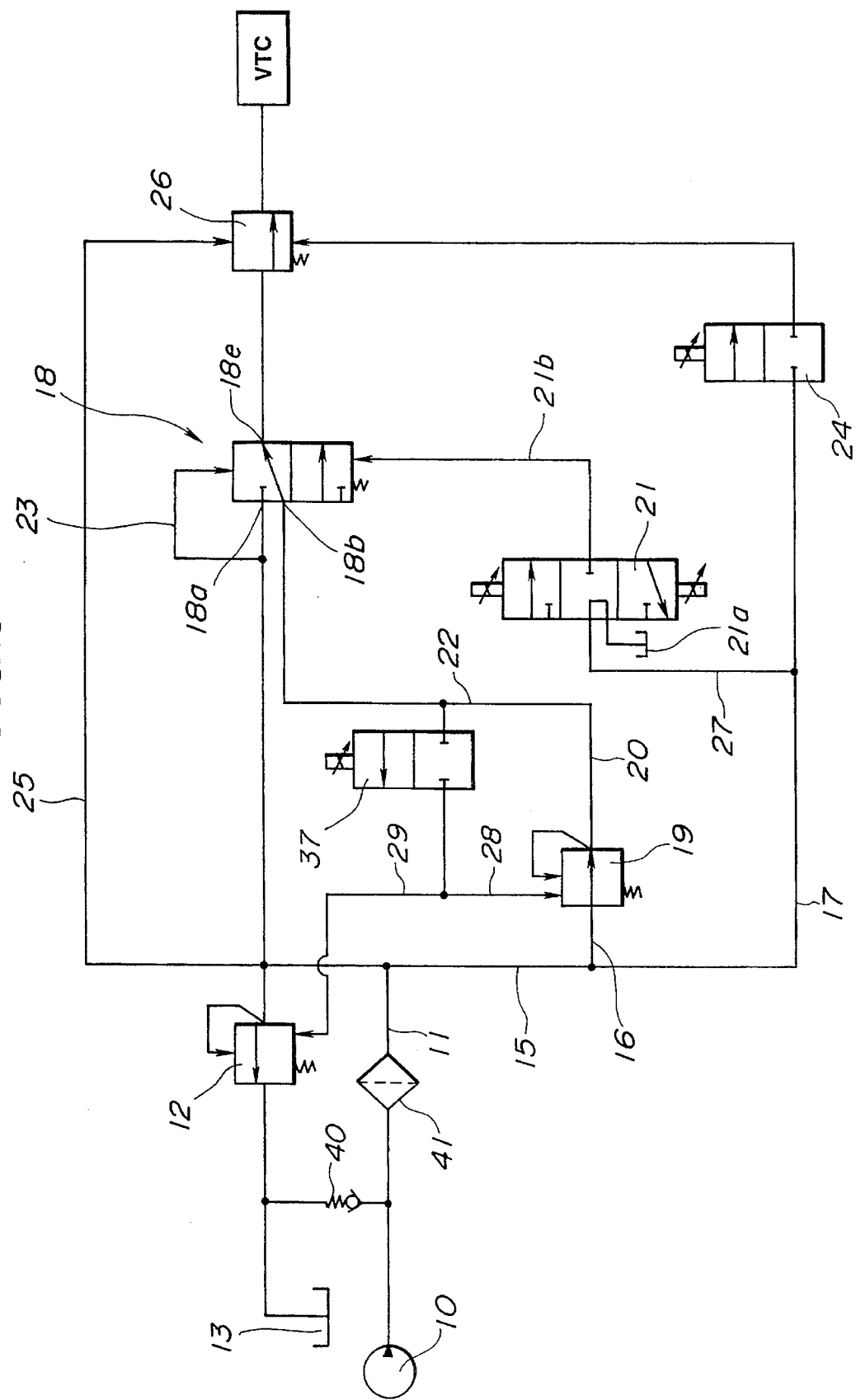
FIG. 3 is a hydraulic circuit which is provided when the fluid pressure control device of the present invention takes a second operation mode.

A fluid circuit provided when this second operation mode is established is equivalent to the circuit which is illustrated in FIG. 3.

In response to the open and close operation of the switch valve controlling electromagnetic valve 24, the switch valve 26 carries out its open and close operation synchronously. That is, when the electromagnetic valve 24 is kept deenergized and thus the associated fifth fluid supply line 17 is inoperative, the switch valve 26 is kept OFF as shown. Under this condition, the clutch pressure produced by the clutch pressure control valve 18 is not fed to the valuable torque clutch "VTC" and thus the associated motor vehicle keeps the two wheel drive mode standing by for a subsequent four wheel drive mode. When then the electromagnetic valve 24 is energized and thus the line 17 becomes operative, the switch valve 26 becomes ON and thus the clutch pressure from the valve 18 is permitted to reach the valuable torque clutch "VTC". Thus, the motor vehicle takes the four wheel drive mode instantly. In this mode, the torque distribution between the front and rear wheels is carried out stepwisely in the manner which will become apparent as the description proceeds.

Because, in the second operation mode, the fifth connecting line 23 is in use through which the line pressure is fed to the clutch pressure control valve 18 as a pilot pressure, the valve 18 is biased to take a first position as shown wherein the outlet port 18e thereof is communicated with the fourth connecting line 22 through the second inlet port 18b.

At the same time, the fluid pressure from the clutch pressure controlling electromagnetic valve 21 is also applied to the valve 18 as a pilot pressure. It is to be noted that, in the second operation mode, the pilot pressure from the valve 21 is somewhat higher than that obtained in the above-mentioned first operation mode. That is, in the second operation mode, the line pressure is directly fed to the valve 21 through the first connecting line 27, while in the first operation mode, the fluid pressure fed to the valve 21 is somewhat reduced by the pilot valve 19 (see FIG. 2). Accordingly, when the clutch pressure controlling electromagnetic valve 21 is energized and thus the line pressure is applied to the valve 18 as the pilot pressure, the clutch pressure control valve 18 takes a second position wherein the outlet port 18e is communicated with the second fluid supply line 14 through the first inlet port 18a. Under this condition, the fluid pressure in the line 14 is fed to the switch valve 26. Thus, in the second operation mode, in response to the open and close operation of the valve 21, the clutch pressure control valve 18 can take the first and second positions selectively, the first position being the position wherein the fluid pressure in the fourth connecting line 22 is fed to the switch valve 26 and the second position being the position wherein the fluid pressure in the second fluid supply line 14 is fed to the switch valve 26. That is, in the second operation mode, the clutch pressure control valve 18 acts as a so-called "switch valve" which selectively takes two operative positions in response to the open and close operation of the clutch pressure controlling electromagnetic valve 21.

It is to be noted that the fluid pressure in the second fluid supply line 14 is the line pressure which has been adjusted by the pressure adjusting valve 12 and the fluid pressure in the fourth connecting line 22 is the pressure which has been produced by reducing the line pressure to a predetermined lower level by the pilot valve 19. Thus, the switch valve 26 can receive two types of clutch pressure from the valve 18.

When the fluid pressure in the third connecting line 28 is applied to the pilot valve 19 as a pilot pressure, the outlet pressure of the pilot valve 19 is somewhat reduced as compared with that obtained when such fluid pressure application is not provided. Accordingly, in response to the open and close operation of the electromagnetic valve 37, the pilot valve 19 can produce two types of output pressure. That is, the fourth connecting line 22 can selectively contain two types of fluid pressure.

When the fluid pressure in the second connecting line 29 is applied to the pressure adjusting valve 12 as a pilot pressure, the fluid pressure set by the valve 12 (viz., the fluid pressure in the second fluid supply line 14) is somewhat increased as compared with that obtained when such fluid pressure application is not provided. Accordingly, in response to the open and close operation of the electromagnetic valve 37, the pressure regulating valve 12 can produce two types of fluid pressure. That is, the second fluid supply line 14 can contain two types of fluid pressure.

From the above description, it will be appreciated that, in the second operation mode of the fluid pressure control device 5 of the invention, the clutch pressure control valve 18 can output four types of fluid pressure by selectively operating the two valves 21 and 37. This means that the switch valve 26 can output five types of fluid pressure including one type which is provided when the switch valve 26 takes its OFF position.

Thus, in the four wheel drive mode, the variable torque clutch "VTC" can receive the four types of fixed clutch pressure from the fluid pressure control device 5 and thus four types of torque distribution ratio can be assuredly provided between the front and rear wheels.

Of course, when the switch valve 26 is turned to take the OFF position as shown, the two wheel drive mode is instantly established.

Figure 6:
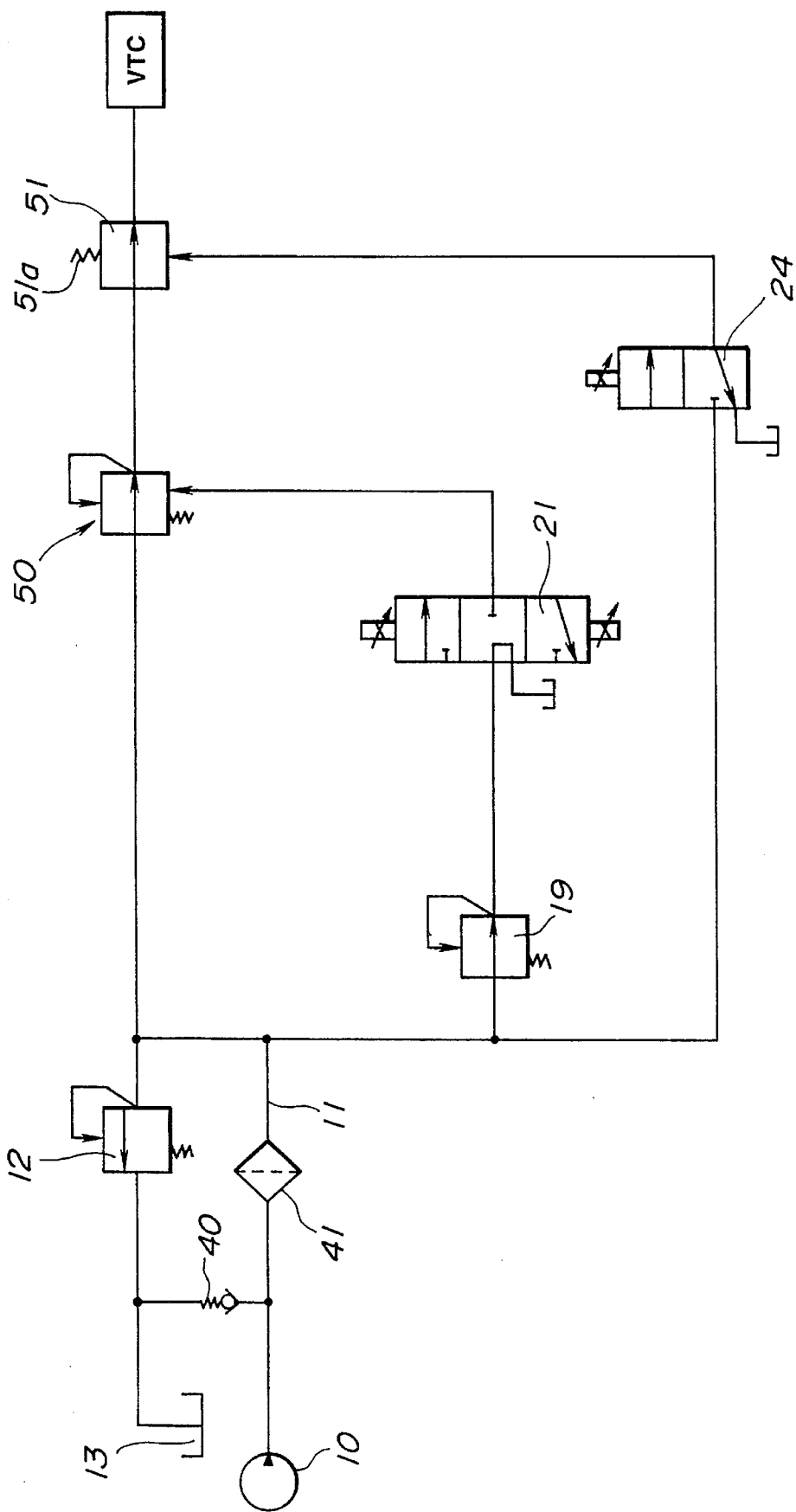
FIG. 6 is a view similar to FIG. 2 but showing a conventional fluid pressure control device.

When, for switching the drive mode from the second wheel drive mode to the four wheel drive mode, the switch valve controlling electromagnetic valve 24 is energized, the line pressure in the fifth fluid supply line 17 is instantly applied to the switch valve 26 to turn the same to the ON position. This switch operation of the switch valve 26 does not cause any fluid draining unlike in the case of the above-mentioned conventional device of FIG. 6. Thus, in the present invention, undesired pressure drop does not occur during such operation mode change.

What is claimed is:

1. In a four wheel drive system having a variable torque transfer through which the driving force distribution between front and rear wheels of a vehicle is varied in accordance with the magnitude of fluid pressure supplied to the transfer, a fluid pressure control device for producing the fluid pressure supplied to said transfer, which comprises:

a first hydraulic circuit which is arranged to have a first operation mode wherein the first hydraulic circuit outputs, for the transfer, a fluid pressure which is varied continuously;

a second hydraulic circuit which is arranged to have a second operation mode wherein the second hydraulic circuit outputs, for the transfer, a fluid pressure which is varied stepwisely;

piping means for connecting said first and second hydraulic circuits to constitute a united hydraulic circuit; and shutters arranged in given portions of said piping means to selectively open and close the given portions for allowing said united hydraulic circuit to have said first and second operation modes selectively.

2. A fluid pressure control device as claimed in claim 1, in which said second hydraulic circuit comprises:

a first valve which is arranged to selectively produce two types of fluid pressure for said transfer;

a second valve which is arranged to selectively produce two types of fluid pressure for said transfer;

a third valve which has both a first operative position wherein said first valve is operatively communicated with said transfer and a second operative position wherein said second valve is operatively communicated with said transfer; and a fourth valve which causes each of said first and second valves to selectively output the two types of fluid pressure.

3. A fluid pressure control device as claimed in claim 2, in which said second hydraulic circuit further comprises:

a fifth valve which is arranged to cause said third valve to take said first and second operative positions selectively.

4. A fluid pressure control device as claimed in claim 3, in which said second hydraulic circuit further comprises:

a sixth valve which has both ON position wherein the third valve is operatively communicated with said transfer and OFF position wherein the communication between said third valve and said transfer is blocked; and a seventh valve which causes said sixth valve to take said ON and OFF positions selectively.

5. A fluid pressure control device as claimed in claim 4, in which said fourth valve has both ON position wherein the output pressure of said second valve is applied to said first and second valves as a pilot pressure and OFF position wherein the application of the output pressure of said second valve to said first and second valves is blocked.

6. A fluid pressure control device as claimed in claim 5, in which said fourth valve is operatively interposed between one fluid line through which the output pressure of said fourth valve is applied to said first and second valves as the pilot pressure and the other fluid line through which the output pressure of said second valve is applied to said third valve as an inlet pressure for the same.

7. A fluid pressure control device as claimed in claim 6, in which said fifth valve is of an electromagnetic valve having first, second and third positions which are selectively taken upon energization or deenergization of the valve, said first position being a position wherein the fluid pressure produced by said first valve is applied to said third valve as a pilot pressure, said second position being a position wherein the application of the fluid pressure from said first valve to said third valve is blocked while discharging the fluid pressure into a draining system, and said third position being a position wherein the application of the fluid pressure from said first valve to said third valve is blocked while discharging the fluid contained in a pilot line between said fifth valve and said third valve into said draining system.

8. A fluid pressure control device as claimed in claim 7, in which said seventh valve has both a first position wherein the fluid pressure produced by said first valve is applied to said sixth valve as a pilot pressure to cause the same to take ON position and a second position wherein the application of the fluid pressure from said first valve to said sixth valve is blocked to cause said sixth valve to take OFF position.

9. A fluid pressure control device as claimed in claim 8, in which said first hydraulic circuit comprises:

said first valve which, in the first operation mode, produces a predetermined line pressure;

said second valve which, in the first operation mode, reduces said predetermined line pressure to a certain level thereby to produce a reduced fluid pressure;

said third valve which, in the first operation mode, treats said predetermined line pressure and produces a clutch pressure for said transfer; and said fifth valve which, in the first operation mode, treats said reduced fluid pressure from said second valve to produce a continuously variable fluid pressure which is applied to said third valve as a pilot pressure thereby to cause the clutch pressure outputted from said third valve to be continuously varied.

10. A fluid pressure control device as claimed in claim 9, in which, in the first operation mode, said fifth valve is actuated to carry out an open and close operation at high speed by switching the first, second and third positions quickly.

11. A fluid pressure control device as claimed in claim 10, in which said shutters comprise:

a first shutter which is arranged in a fluid line which connects an inlet port of said fifth valve with an inlet port of said second valve, said first shutter being open when said united hydraulic circuit assumes said second operation mode;

a second shutter which is arranged in a fluid line which connects an inlet port of said fourth valve and a second inlet port of said third valve, said second shutter being open when said united hydraulic circuit assumes said second operation mode;

a third shutter which is arranged in the fluid line between the fourth valve and the second inlet port of said third valve at a position near said second inlet port, said third shutter being open when said united hydraulic circuit assumes said second operation mode;

a fourth shutter which is arranged in a pilot fluid line through which the fluid pressure produced by said first valve is applied to said third valve as a pilot pressure, said fourth shutter being open when said united hydraulic circuit assumes said second operation mode;

a fifth shutter which is arranged in a fluid line which extends between an outlet port of said second valve and the inlet port of said fifth valve, said fifth shutter being closed when said united hydraulic circuit assumes said second operation mode, said fluid line having at an upstream portion of said fifth shutter a portion to which a fluid line extending from second and third shutters is connected and at a downstream portion of said fifth shutter a portion to which a fluid line from said first shutter is connected; and a sixth shutter which is arranged in a fluid line through which the outlet pressure of said third valve is applied to the same as a pilot pressure, said sixth shutter being closed when said united hydraulic circuit assumes said second operation mode.

12. A fluid pressure control device as claimed in claim 1, in which said first hydraulic circuit comprises:

a first valve which is arranged to produce a predetermined line pressure;

a second valve which reduces said predetermined line pressure to a certain level thereby to produce a reduced fluid pressure;

a third valve which treats said predetermined line pressure and produces a clutch pressure for said transfer; and a fifth valve which treats said reduced fluid pressure from said second valve to produce a continuously variable fluid pressure which is applied to said third valve as a pilot pressure thereby to cause the clutch pressure outputted from said third valve to be continuously varied.

13. A fluid pressure control device as claimed in claim 12, in which said fifth valve is of an electromagnetic valve having first, second and third positions which are selectively taken upon energization or deenergization of the valve, said first position being a position wherein the predetermined line pressure produced by said first valve is applied to said third valve as a pilot pressure, said second position being a position wherein the application of the line pressure to said third valve is blocked while discharging the line pressure into a draining system, and said third position being a position wherein the application of the line pressure to said third valve is blocked while discharging the fluid contained in a pilot line between said fifth valve and said third valve into said draining system.

14. A fluid pressure control device as claimed in claim 13, in which said first hydraulic circuit further comprises:

a sixth valve which has both ON position wherein the third valve is operatively communicated with said transfer and OFF position wherein the communication between said third valve and said transfer is blocked; and a seventh valve which causes said sixth valve to take said ON and OFF positions selectively.

15. A fluid pressure control device as claimed in claim 14, in which said seventh valve has both a first position wherein the line pressure produced by said first valve is applied to said sixth valve a pilot pressure to cause the same to take ON position and a second position wherein the application of the line pressure to said sixth valve is blocked to cause said sixth valve to take OFF position.

* * * * *